United States Patent
Woo et al.

(10) Patent No.: US 8,484,889 B2
(45) Date of Patent: Jul. 16, 2013

(54) SEED STICKER

(75) Inventors: Tae Ha Woo, Daejeon (KR); Jung Min Seo, Daejeon (KR)

(73) Assignee: OMICSIS, Inc., Daejeon (KR)

( * ) Notice: Subject to any disclaimer, the term of this patent is extended or adjusted under 35 U.S.C. 154(b) by 0 days.

(21) Appl. No.: 13/259,922

(22) PCT Filed: Sep. 29, 2009

(86) PCT No.: PCT/KR2009/005548
§ 371 (c)(1),
(2), (4) Date: Sep. 23, 2011

(87) PCT Pub. No.: WO2010/110512
PCT Pub. Date: Sep. 30, 2010

(65) Prior Publication Data
US 2012/0011770 A1    Jan. 19, 2012

(30) Foreign Application Priority Data
Mar. 25, 2009    (KR) .................. 10-2009-0025189

(51) Int. Cl.
*A01C 1/04*  (2006.01)
*A01C 1/00*  (2006.01)

(52) U.S. Cl.
CPC .. *A01C 1/044* (2013.01); *A01C 1/04* (2013.01)
USPC ................................................ 47/56; 47/15

(58) Field of Classification Search
USPC ............................................................ 47/56
See application file for complete search history.

(56) References Cited

U.S. PATENT DOCUMENTS

| | | | | |
|---|---|---|---|---|
| 3,908,308 A | * | 9/1975 | Meyers | 47/56 |
| 4,283,880 A | * | 8/1981 | Fjeldsa | 47/56 |
| 5,557,096 A | * | 9/1996 | Watanabe et al. | 235/492 |
| 5,720,129 A | * | 2/1998 | Lantinberg | 47/56 |
| 6,578,317 B1 | * | 6/2003 | Ahm | 47/56 |
| 6,594,927 B2 | * | 7/2003 | Witkowski | 40/310 |
| 6,735,902 B1 | * | 5/2004 | Ahm | 47/56 |
| 7,125,449 B2 | * | 10/2006 | Hubbs | 106/272 |
| 2002/0040670 A1 | | 4/2002 | Hornak | |

(Continued)

FOREIGN PATENT DOCUMENTS

| | | |
|---|---|---|
| KR | 20-0392343 Y1 | 8/2005 |
| WO | WO 2005/002318 A1 | 1/2005 |

OTHER PUBLICATIONS

International Search Report for PCT/KR2009/005548 filed on Sep. 29, 2009.

*Primary Examiner* — Monica Williams
*Assistant Examiner* — Marc Burgess

(57) ABSTRACT

The present invention relates to a seed sticker for seeding and planting flowers or sprouts easily and quickly in a small vessel or in a flower garden and a manufacturing method thereof. The present invention is characterized by a seed sticker, inside of which a seed is enshrined, comprising: a transfer paper wherein a coating layer is formed on the surface of the transfer paper; an adhesive layer which is formed on the surface of the coating layer; a seed pellet which is enshrined on the surface of the adhesive layer; a red clay soil sheet accumulated over the upper part of the seed pellet; and a polyvinyl alcohol (PVA) sheet accumulated over the upper part of the red clay soil sheet and covering both the seed pellet and the red clay soil sheet, and the edge of which is bonded to the adhesive layer.

3 Claims, 2 Drawing Sheets

U.S. PATENT DOCUMENTS

| | | | |
|---|---|---|---|
| 2004/0045217 A1* | 3/2004 | Chiddick et al. | 47/59 S |
| 2006/0162248 A1* | 7/2006 | Ahm | 47/56 |
| 2007/0067248 A1* | 3/2007 | Chatte | 705/401 |
| 2007/0094927 A1* | 5/2007 | Perry | 47/65.9 |
| 2008/0072488 A1* | 3/2008 | Fujita | 47/56 |
| 2008/0250689 A1* | 10/2008 | Cohen | 40/664 |
| 2011/0302835 A1* | 12/2011 | Ray et al. | 47/56 |

* cited by examiner

SEED STICKER

TECHNICAL FIELD

The present invention relates to a seed sticker for seeding and planting flowers or sprouts easily and quickly in a small vessel such as a pot at home or in a flower garden and a manufacturing method thereof, and particularly, to a seed sticker in which seeds are mixed with fertilizer, germinating accelerator and culture soil, formed into a pellet shape, covered with a red clay soil sheet, and then covered with a coating material such as a coating paper or film so as to be formed into a sticker type, thereby sowing seeds easily and quickly.

BACKGROUND ART

Generally, in order to cultivate various plants, seeds are sowed, geminated and raised on a seed bed, and then replanted in the soil, or otherwise the seeds are directly sowed, geminated and raised in the soil.

However, since the conventional seeding method largely depends on manual labor, it has low work efficiency due to a heavy work load, and also since it is slow in progress, it has low productivity. Further, if it has not good environmental conditions or does not take sufficient nutrients necessary to germinate the seeds, it shows a very poor germination rate.

Recently, in order to improve the seeding efficiency and the productivity, there has been developed a tape type seed packaging method in which vegetable, grain and other plant seeds are packaged with polyvinyl alcohol tape, cotton linter tape or the like, thereby providing the seeds in the form of a tape. In such method, the seeds stored in the packaged state are located on the corresponding soil surface upon the sowing of seeds, covered with soil and then watered, such that the proper number of seeds is arranged at proper intervals, thereby enhancing the working convenience and productivity thereof.

However, since it is difficult to individually package small-sized light seeds such as sprouts and flower seeds, the tape type seed packaging method can be restrictedly applied to relatively large-sized seeds such as sunflower seeds. In addition, in order to germinate the seeds packaged in the tape, it is necessary to cover the packaged seeds with the soil. Herein, if an excessive or insufficient amount of soil is covered on the seeds, the germination rate is considerably reduced, and thus the seeds have to be covered by a proper amount of soil. Furthermore, since each kind of seed has its own properties, it is substantially difficult to confirm the properties at the sowing place and also to cover the proper amount of soil on the seeds.

Moreover, there is recently an increasing tendency to cultivate sprouts or flowering plants at dwellings such as houses and apartments. In this case, it is necessary to use a vessel for planting the sprouts or flowering plants, and further, since a user would like to cultivate various kinds of plants, it is difficult to satisfy the user's demand with the tape type seeds in which one kind of seed is packaged.

DISCLOSURE

Technical Problem

An object of the present invention is to provide a seed sticker which can package various kinds of seeds at proper intervals or in various forms, and which a proper amount of soil is previously stacked thereon so that packaged seeds are germinated by only supplying water, and a manufacturing method thereof.

Technical Solution

To achieve the object of the present invention, the present invention provides a seed sticker in which a seed is placed, including a transfer paper which a coating layer is formed on a surface thereof; an adhesive layer which is formed on the coating layer; a seed pellet which is placed on the adhesive layer; a red clay soil sheet which is stacked on the seed pellet; and a polyvinyl alcohol (PVA) sheet which is stacked on the red clay soil sheet so as to cover both the seed pellet and the red clay soil sheet and edges of which are bonded to the adhesive layer.

Further, the present invention provides a method of manufacturing a seed sticker in which a seed is placed, including preparing a transfer paper having a coating layer formed thereon, which is cut and supplied into a predetermined length; forming an adhesive layer by coating an adhesive on the coating layer of the transfer paper; preparing a seed pellet and arranging the seed pellet at regular intervals on the adhesive layer; stacking a red clay soil sheet on the seed pellet; attaching a film on the red clay soil sheet so that edges of the film are attached to the adhesive layer; and cutting the finished seed sticker into a predetermined size and a desired shape.

Advantageous Effects

According to the present invention as described above, since the seeds are packaged in the sticker form, it is possible to cultivate desired kinds of plants in predetermined forms. Further, since the proper amount of soil is previously stacked on the seeds, it is possible to easily cultivate the plants by supplying water to the seed sticker located in a vessel.

DESCRIPTION OF DRAWINGS

The above and other objects, features and advantages of the present invention will become apparent from the following description of preferred embodiments given in conjunction with the accompanying drawings, in which.

[Detailed Description of Main Elements]

Figure 1:
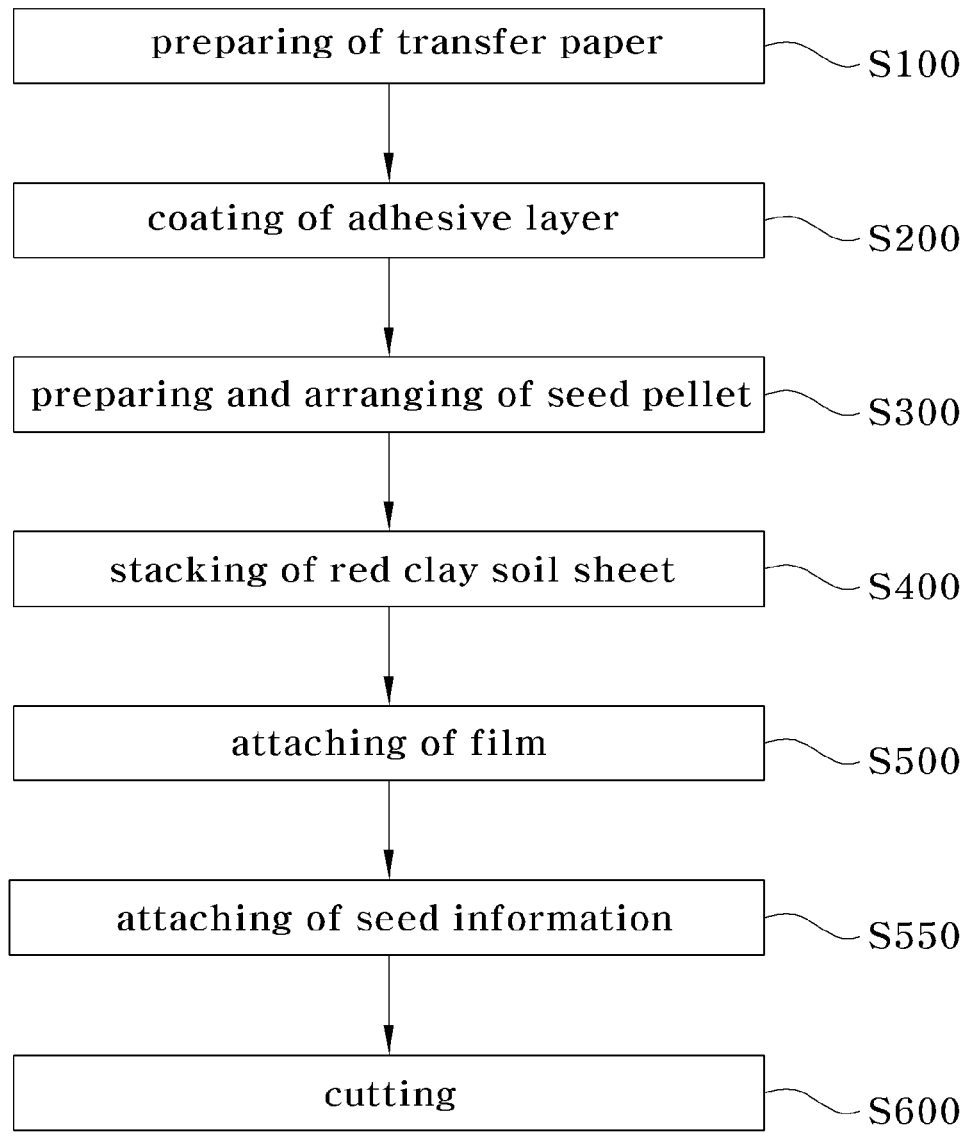
FIG. 1 is a flow chart showing a method of manufacturing a seed sticker according to the present invention.
Figure 2:
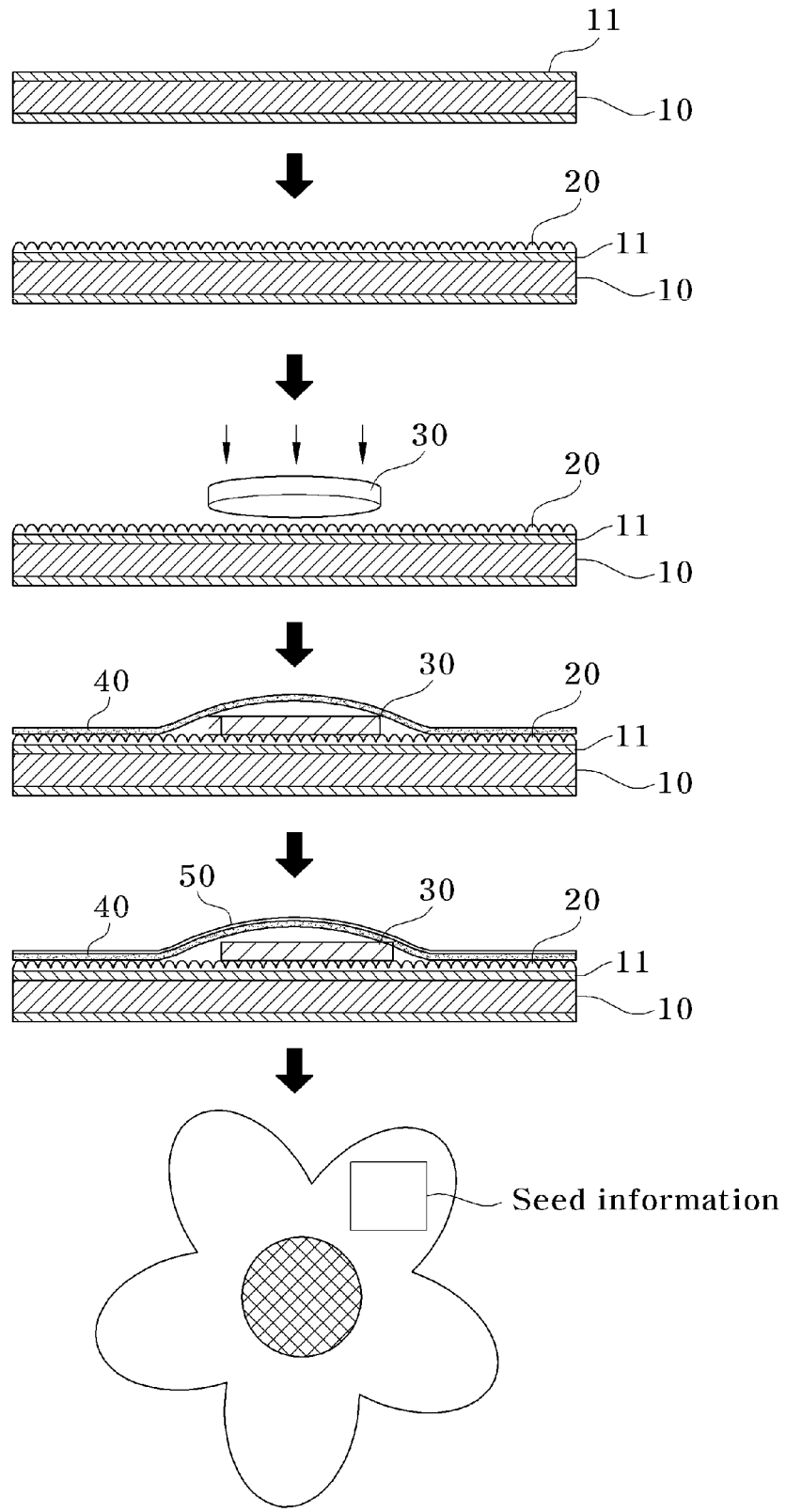
FIG. 2 is a cross-sectional view showing a configuration of the seed sticker according to the present invention.

| | |
|---|---|
| 10: transfer paper | 11: coating layer |
| 20: adhesive layer | 30: seed pellet |
| 40: red clay soil sheet | 50: film |

BEST MODE

Hereinafter, the embodiments of the present invention will be described in detail with reference to accompanying drawings.

A method of manufacturing a seed sticker according to the present invention includes the following steps.

(1) Preparing of Transfer Paper S100

In the transfer paper preparing step S100, a roll type transfer paper 10 is cut in a predetermined length so as to provide at a sticker manufacturing process. The transfer paper 10 is a base member on which a seed and other materials are attached and has a slick coating layer 11 which is formed on an upper surface of the transfer paper 10 by applying silicon coating liquid so that an adhesive to be described layer can be facilely separated from that.

(2) Coating of Adhesive S200

In the adhesive coating step S200, an adhesive is uniformly coated on the upper surface of the transfer paper 10 so that the seed and the like can be attached thereon. The adhesive coated on the upper surface of the transfer paper 10 is naturally dried with the passage of time so as to form an adhesive layer 20. The adhesive includes PVA (Polyvinyl alcohol) or a material that is facilely bonded to the PVA.

(3) Manufacturing and Arranging of Seed Pellet S300

In this step S300, a seed pellet 30 is arranged and bonded on the adhesive layer 20 formed at the adhesive coating step S200. Thus the seed pellet 30 is fixed at a desired position of the transfer paper 10.

The present invention is to easily cultivate flowers or sprouts. The seeds used in the present invention have a relatively small size, and thus it is very difficult to arrange the seeds one by one. Therefore, in the present invention, the seeds and nutrients are put into a mixer, uniformly stirred with water and then prepared and dried into a disk-shaped pellet. Herein, the nutrients may be in the form of powder having a small particle size. In this case, ventilation property of the seed pellet may be deteriorated due to the powder type nutrients, and thus a germination rate may be lowered. Therefore, in the present invention, a supplemental agent such as vegetable fiber and wood pulp is additionally mixed with the nutrients so that air can be sufficiently supplied to the seeds and thus the germination rate is increased.

In addition, after moisture in the seed pellet is evaporated in the drying process, since the seed pellet may not keep its own shape, it is preferable that a desired amount of glue is added when the seeds are mixed with the supplemental agent and the nutrients. Methyl cellulose which is environmental friendly and water-soluble resin is preferably used as the glue.

After preparing of the seed pellet, desired kinds of seed pellets are arranged in an appropriate form. Herein, in case that the seed sizes are different from each other, a height of a red clay soil sheet to be stacked on the seed pellets is also changed, and thus the seed pellets having a similar seed size are preferably arranged.

(4) Stacking of Red Clay Soil Sheet S400

In this step S400, a red clay soil sheet 40 is stacked on the seed pellet 30.

The red clay soil sheet is prepared by mixing stone and red clay soil at a certain ratio with water and then passing through heating rollers. Herein, if the red clay soil sheet 40 is prepared by mixing only the stone and red clay soil, it may be easily broken even with a small impact, and thus it is preferable that a desired amount of glue is added when the stone and red clay soil are mixed. Methyl cellulose which is environmental friendly and water-soluble resin is preferably used as the glue. The amount of the glue is determined within a proper ratio which does not deteriorate hygroscopic property and ventilation property.

Herein, a height of the red clay soil sheet 40 is changed according to seed sizes of the seed pellets. In this case, while a film is attached on the red clay soil sheet 40, the red clay soil sheet 40 having a high height may be excessively pressed by the film, and the red clay soil sheet 40 having a low height may be not appropriately pressed. Therefore, it is preferable that the seed pellets having similar seed sizes are arranged and thus the red clay soil sheets 40 having similar heights are used.

(5) Attaching of Film S500

In this step S500, the seed pellet and the red clay soil sheet are covered by a film formed of a water-soluble resin. The film has an enough size to sufficiently cover the whole red clay sheet so that edges of the film are bonded to the adhesive layer on the transfer paper. Preferably, the film is formed of environmental-friendly and water soluble methyl cellulose.

(6) Attaching of Seed Information S550

After the seed is manufactured in the sticker form, the sticker is packaged and then released. In this case, information of the seed and necessary to germinate the seed, such as the kind of seed, the time period for germination and the necessary amount of water may be printed on a surface of the package. However, in case that the seed is directly released in the sticker form, it is difficult to provide the information.

According to the present invention, in order to solve the problem, an identification code like bar code including information relevant to the seed may be printed on a surface of the film, or an RFID chip including information such as a genetic marker may be built in the film so as to allow a user to obtain the information through an Internet home page or to read the information through the RFID chip. Preferably, this process is carried out before a next step S600 of cutting the seed sticker.

(7) Cutting of Seed Sticker S600

In this step S600, the finished seed sticker is cut into a predetermined size and a desired shape like a flower.

INDUSTRIAL APPLICABILITY

According to the present invention as described above, since the seeds are packaged in the sticker form, it is possible to cultivate desired kinds of plants in predetermined forms. Further, since the proper amount of soil is previously stacked on the seeds, it is possible to easily cultivate the plants by supplying water to the seed sticker located in a vessel.

While the present invention has been described with respect to the specific embodiments, it will be apparent to those skilled in the art that various changes and modifications may be made without departing from the spirit and scope of the invention as defined in the following claims.

The invention claimed is:

1. A seed sticker in which a seed is placed, comprising:
   a transfer paper having a coating layer formed over a surface thereof;
   an adhesive layer which is formed over the coating layer;
   a seed pellet which is placed over the adhesive layer;
   a red clay soil sheet which is stacked over the seed pellet, wherein the red clay soil sheet includes a mixture of red clay soil, stone, and glue, and wherein the glue includes methyl cellulose; and
   a water-soluble resin film which is stacked over the red clay soil sheet and covers both the seed pellet and the red clay soil sheet, wherein edges of the water-soluble resin film are bonded to the adhesive layer.

2. The seed sticker according to claim 1,
   wherein the seed pellet includes a mixture of seeds, nutrients, and a supplemental agent, and
   wherein the supplemental agent includes vegetable fiber or pulp.

3. The seed sticker according to any of claims 1 and 2, wherein an identification code including information of the seed is printed on the water-soluble resin film or an RFID chip is built into the water-soluble resin film.

\* \* \* \* \*